March 9, 1926. 1,575,969
W. C. BULL
APPARATUS FOR FABRICATING REENFORCED GLASS
Filed June 26, 1924 10 Sheets-Sheet 3

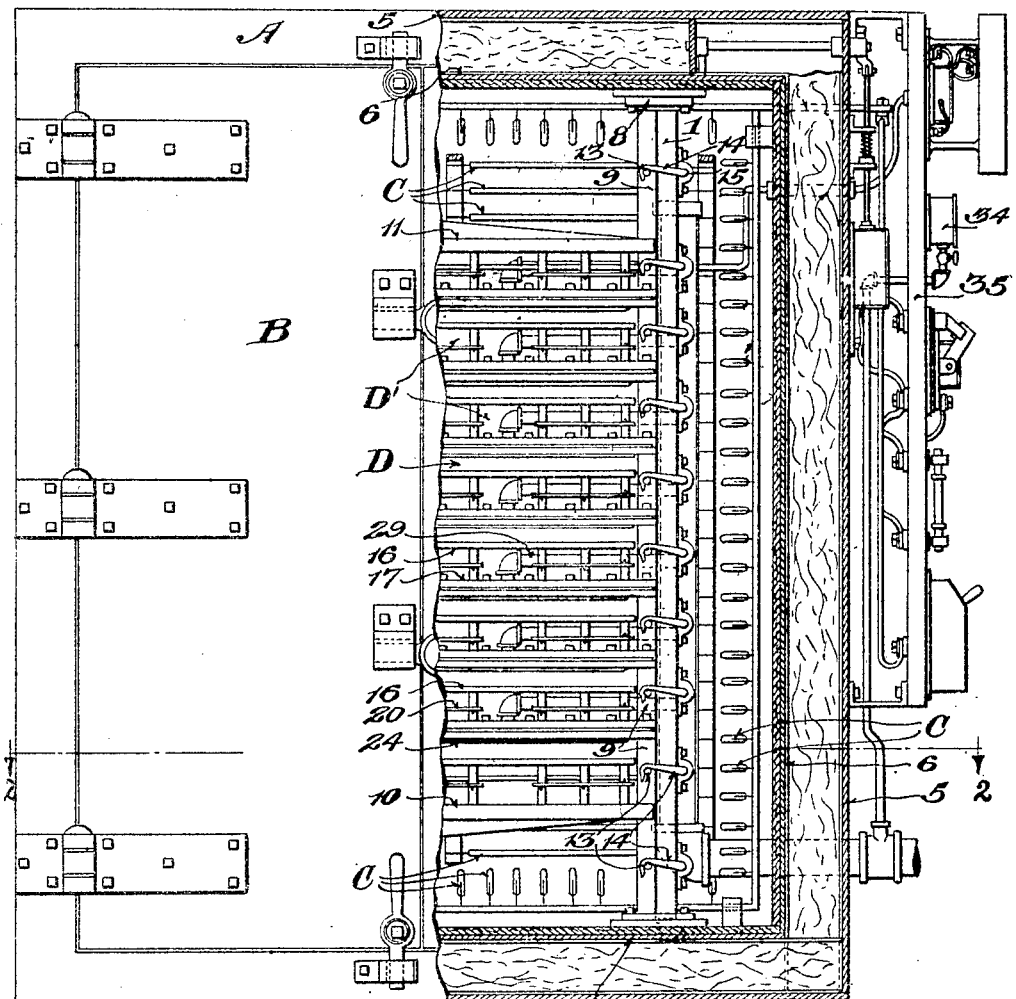

Inventor,
William C. Bull,
By ... Atty.

March 9, 1926. 1,575,969
W. C. BULL
APPARATUS FOR FABRICATING REENFORCED GLASS
Filed June 26, 1924 10 Sheets-Sheet 4
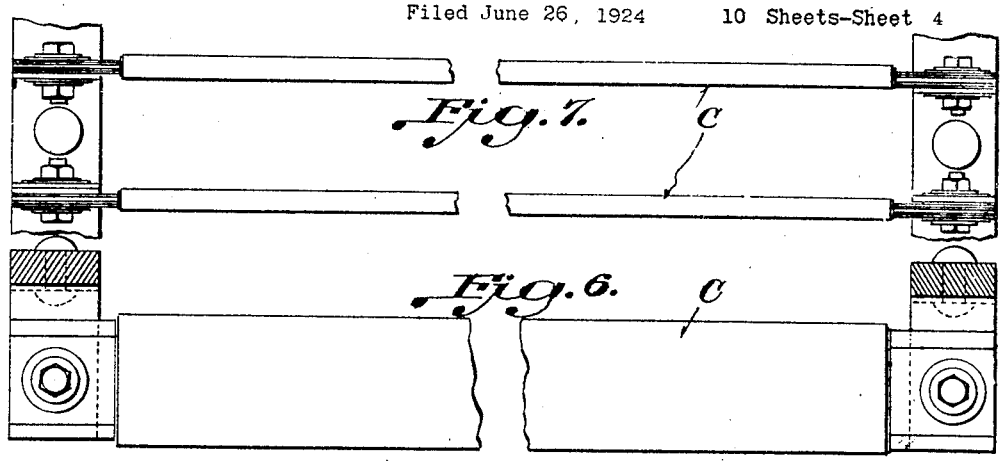
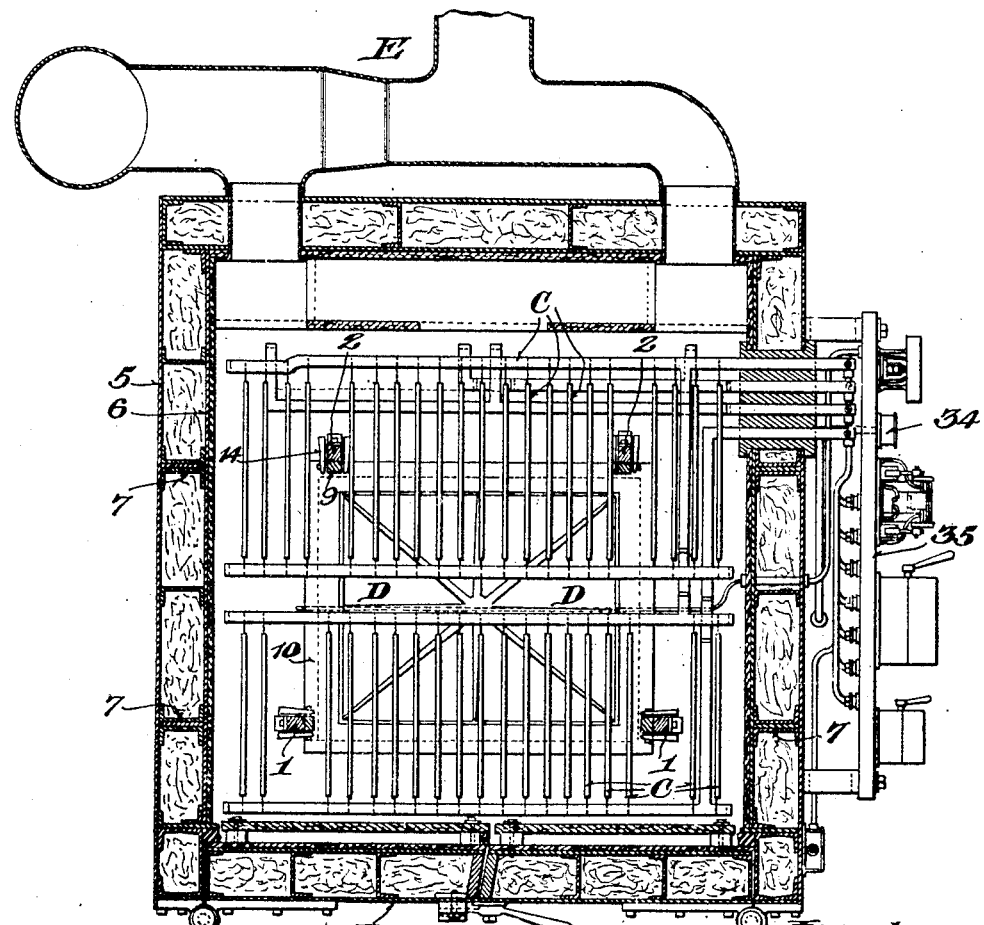

March 9, 1926. 1,575,969
W. C. BULL
APPARATUS FOR FABRICATING REENFORCED GLASS
Filed June 26, 1924 10 Sheets-Sheet 5
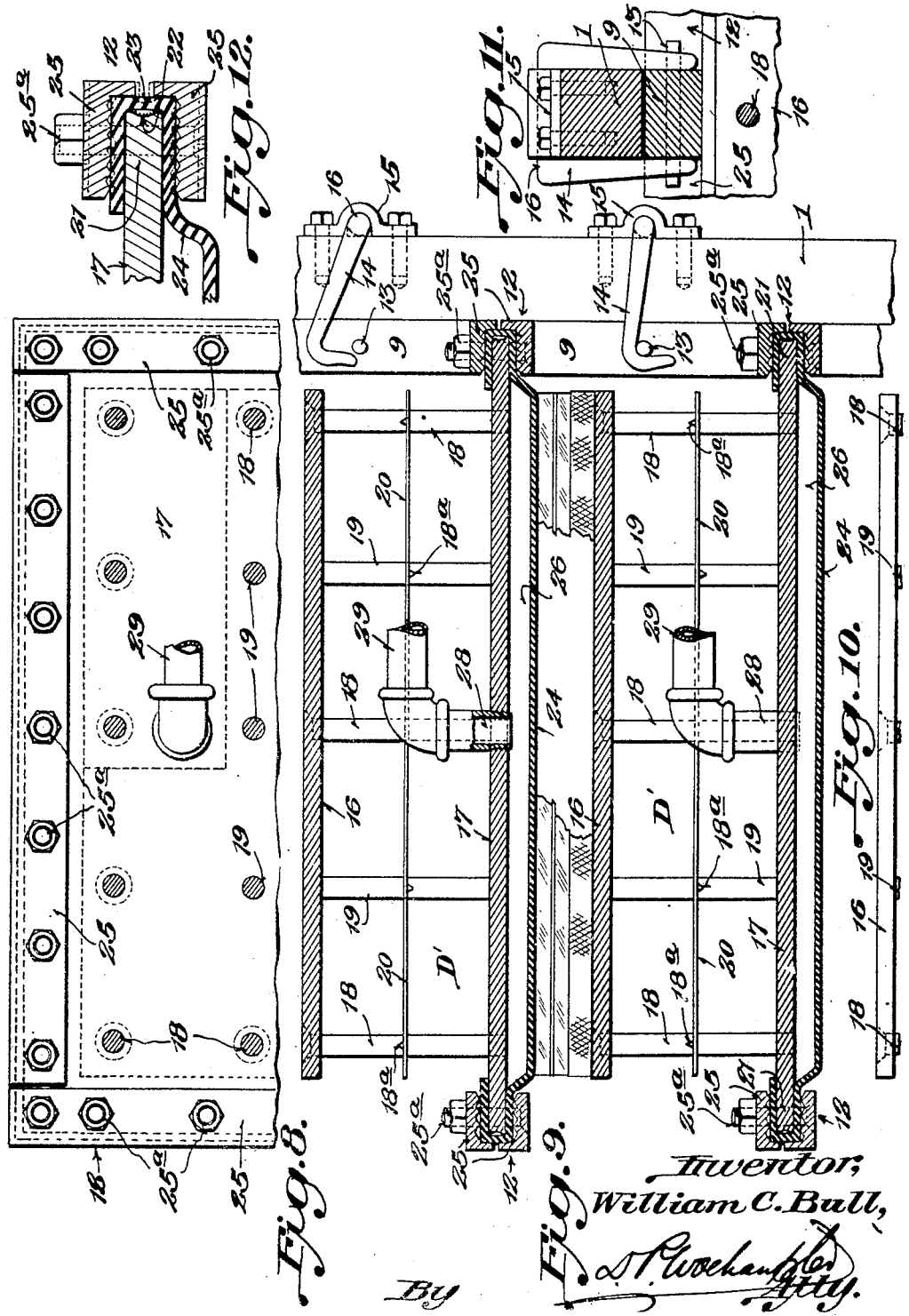

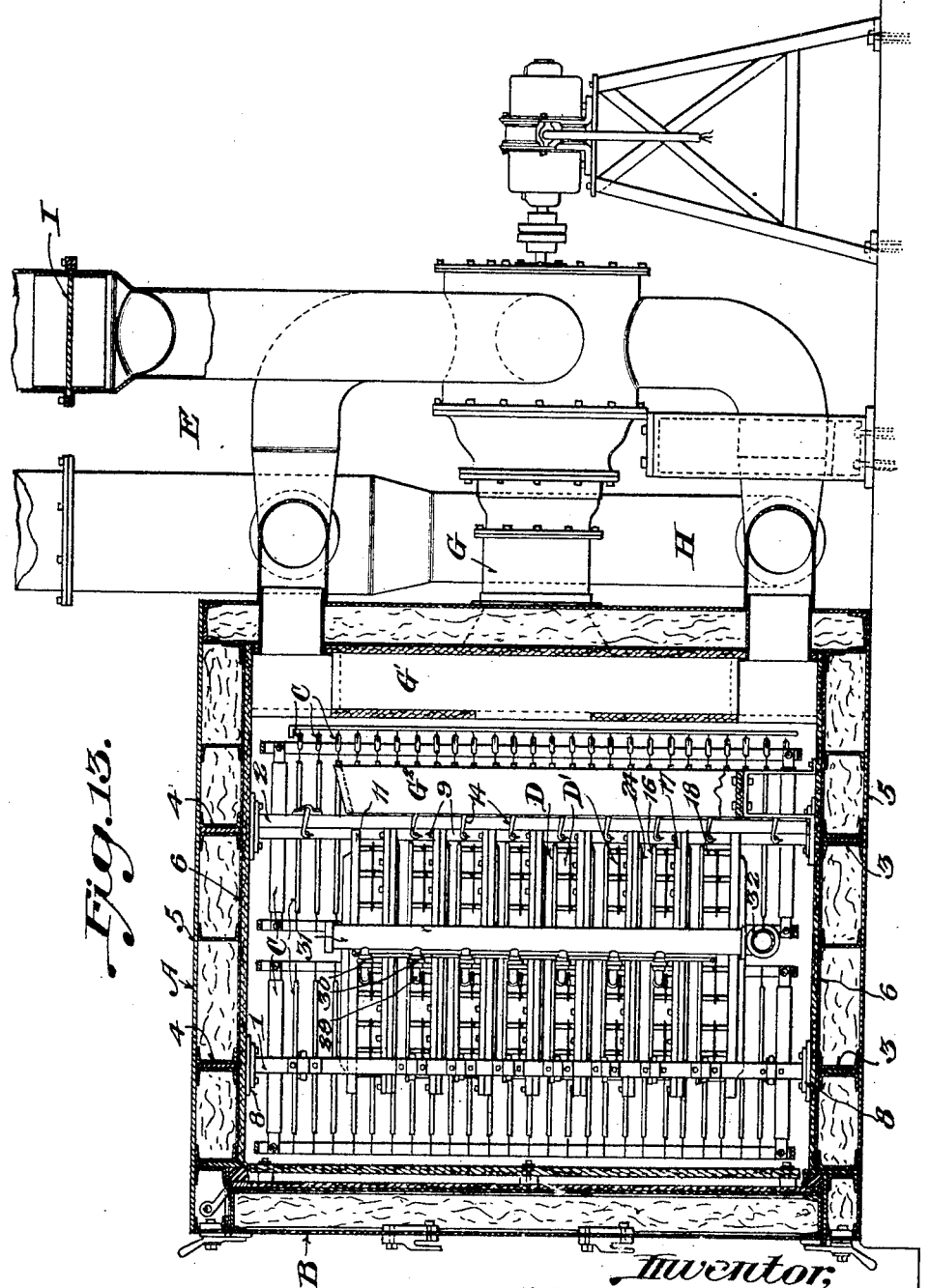

March 9, 1926.  
W. C. BULL  
1,575,969  
APPARATUS FOR FABRICATING REENFORCED GLASS  
Filed June 26, 1924  10 Sheets-Sheet 7
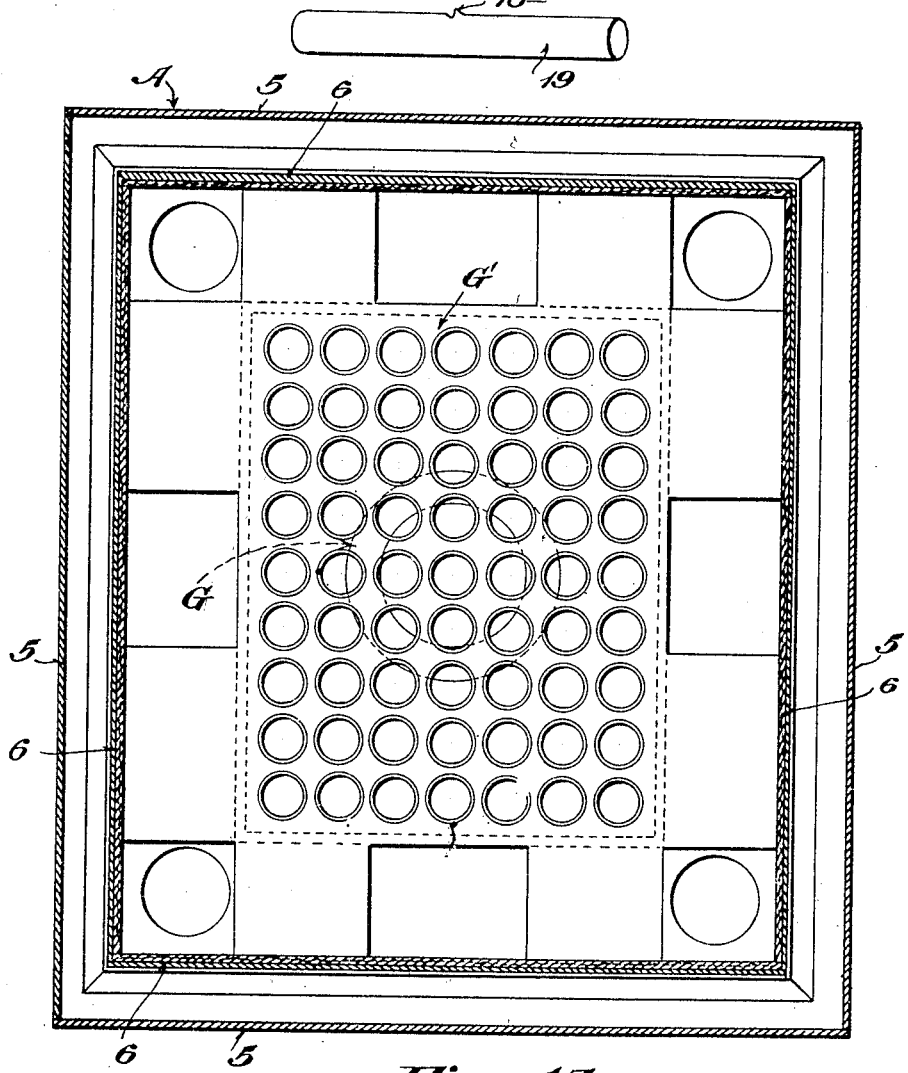
Inventor,  
William C. Bull,  
By ⎯⎯⎯⎯ Atty.

March 9, 1926.
W. C. BULL
1,575,969
APPARATUS FOR FABRICATING REENFORCED GLASS
Filed June 26, 1924    10 Sheets-Sheet 8
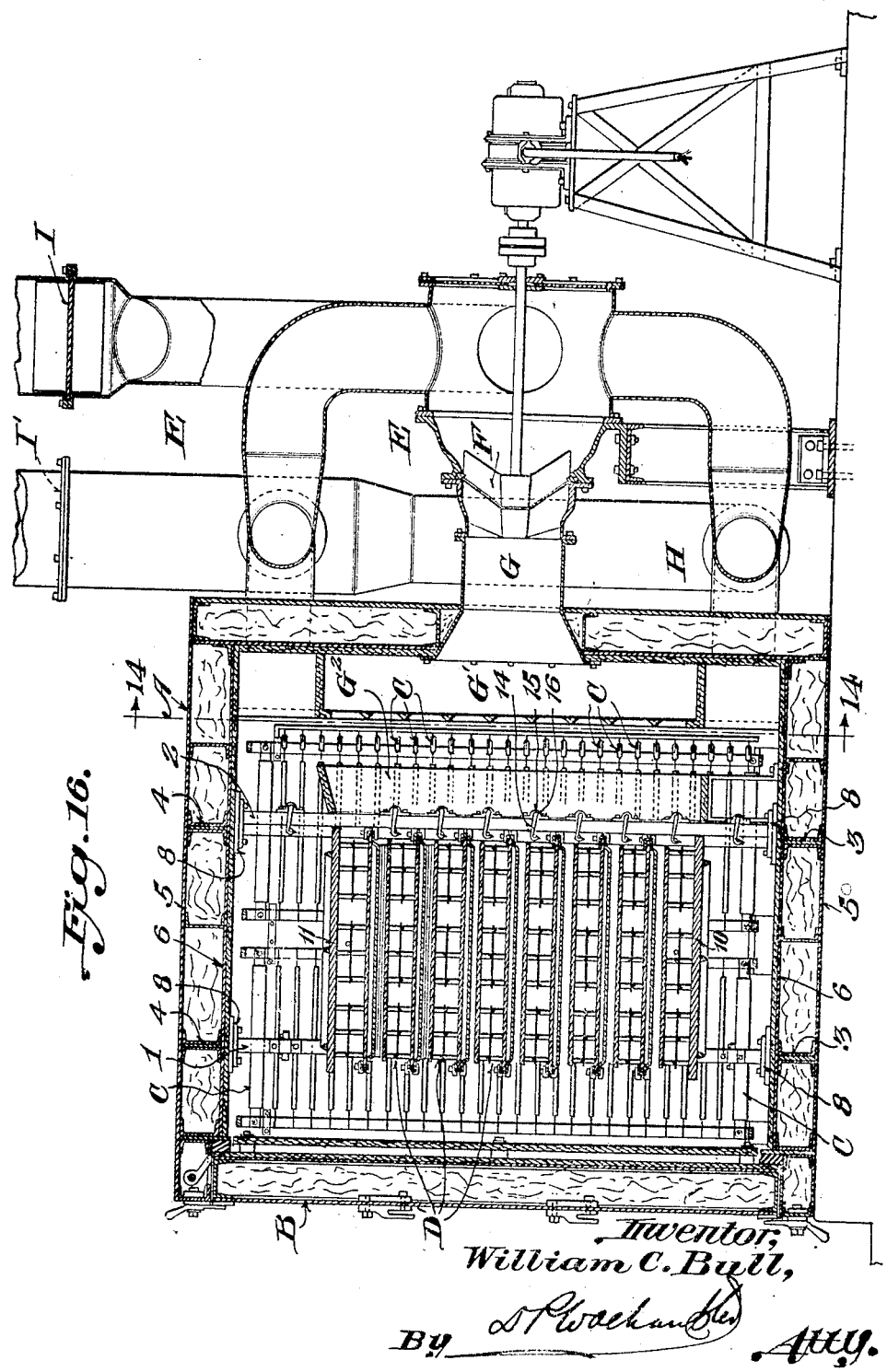

March 9, 1926.  1,575,969
W. C. BULL
APPARATUS FOR FABRICATING REENFORCED GLASS
Filed June 26, 1924   10 Sheets-Sheet 9

Inventor
William C. Bull
By [signature]
Attorney

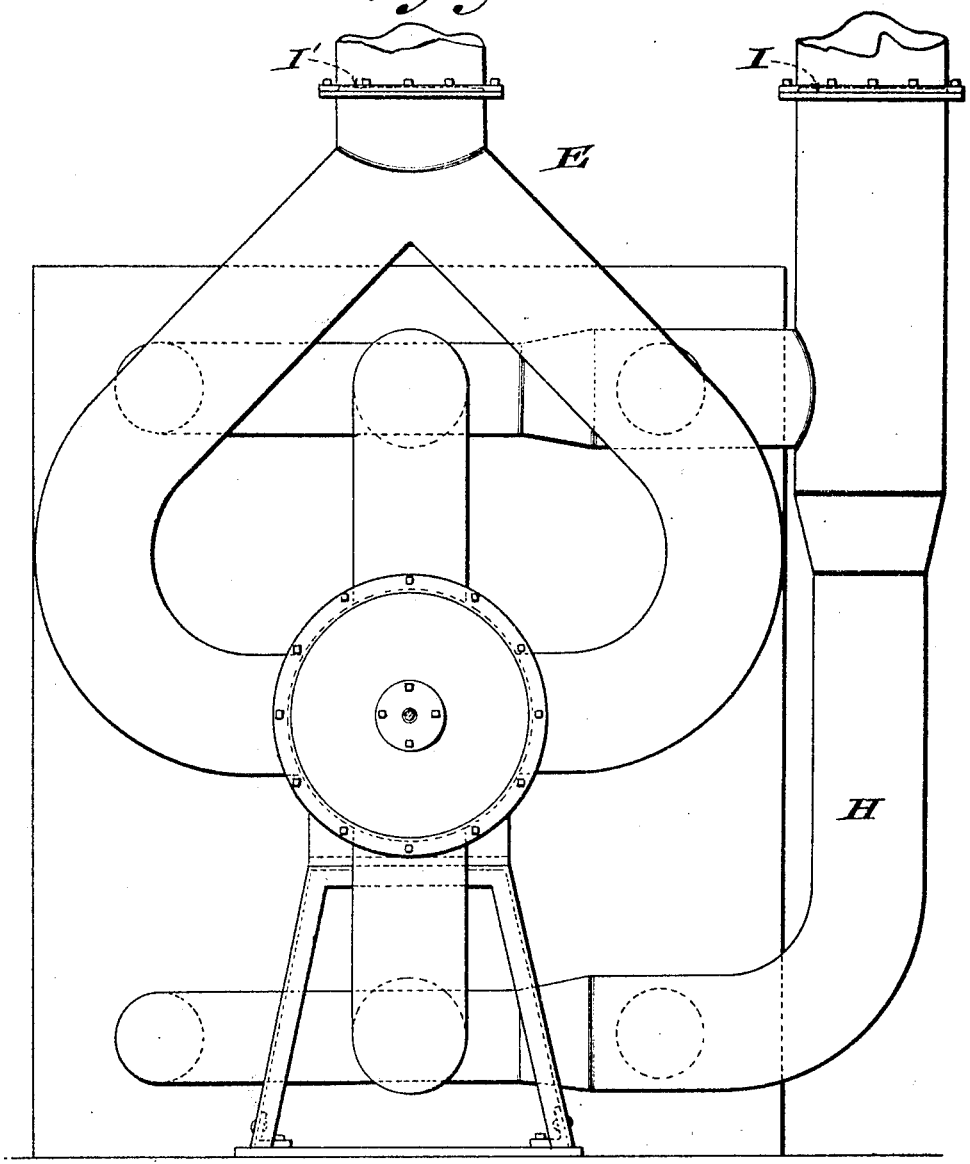

Patented Mar. 9, 1926.

1,575,969

UNITED STATES PATENT OFFICE.

WILLIAM C. BULL, OF BROOKLYN, NEW YORK.

APPARATUS FOR FABRICATING REENFORCED GLASS.

Application filed June 26, 1924. Serial No. 722,519.

*To all whom it may concern:*

Be it known that I, WILLIAM C. BULL, a citizen of the United States, residing at Brooklyn, in the county of Kings and State of New York, have invented certain new and useful Improvements in Apparatus for Fabricating Reenforced Glass, of which the following is a specification.

This invention relates to apparatus for fabricating laminated or reenforced non-shatterable and scatterless glass, and more particularly to an improvement of the type of apparatus set forth in my co-pending application filed June 26, 1924, Serial No. 722,518.

A primary object of the invention is to carry forward the general features and structural characteristics of the apparatus in the application above referred to, and at the same time provide a self-contained press device which is arranged and concealed wholly within the oven of the apparatus. That is to say, it is proposed to provide a novel multiple press device including a plurality of relatively stationary press units each having its own individual pressure applying means, all of such means of all of the units however being subject to common and uniform control from a single point or operating station.

One of the objects of a multiple press device of the type above referred to is to provide a plurality of superposed units wherein the weight of each unit is supported independently of the other, thereby relieving the lower units from the weight of superposed units and making it possible to more accurately apply definite or known pressure to each laminated glass product being treated.

A further object of the invention is to provide a multiple press device which gives a wide range of adjustment both with regard to the individual units and the entire stack or ensemble constituting the device. That is to say, it is proposed to provide a construction wherein the entire press unit and its framing may be removed from the oven to provide for the insertion of a heavier or stouter framing according to the work required of the oven, or on the other hand if the changes involve a mere difference in the thickness of the laminated glass plates to be made, the individual units may be readily removed and suitable removable inserts or spacing elements utilized to provide the necessary distance between the units to accommodate a product of greater thickness.

A still further object of the invention is to provide a novel oven construction having reenforcing elements so arranged and disposed as to effectually carry the dead weight of the press unit and form rigid and strong abutments for taking care of the compressive or expansive strains and forces developed in the various units themselves.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:

Figure 1 is a front elevation of an apparatus showing one of the doors closed and a fractional part of a door broken away to show the interior structural work, and control panel. (Note, see 1—1 of Fig. 2.)

Figure 2 is a horizontal section along line 2—2.

Figure 5 is a horizontal sectional view taken on the line 5—5 of Figure 3.

Figure 6 is a detail of one of the heating elements and its connection to the bus bars.

Figure 7 is a detail of two heating elements showing how all heating elements are connected to the bus bars in pairs by double arm brackets.

Figure 8 is a composite plan of one end of a presser platen showing air pipe connection, spacing studs, sectioned and bolted clamps about the outer edge of the platen plate.

Figure 9 is sectional elevation showing platen plates, spacing studs, baffle plates separators, compressed air pipe connection, elastic compression diaphragm, with clamps securing same in place; duplicate of which indicates the relative relationship of one presser platen plate and its component parts with another; showing also position column, spacing columns, with hook clamps, and the product.

Figure 10 is a detail edge view showing how some of the spacing studs act as bolts to hold the platens together.

Figure 11 sectionalized detail position column and spacing column, with plan of clamp hook retaining same in position.

Figure 12 enlarged sectionalized detail of edge of platen plate, relative position of flexible diaphragm with serrated compression clamps.

Figure 4:
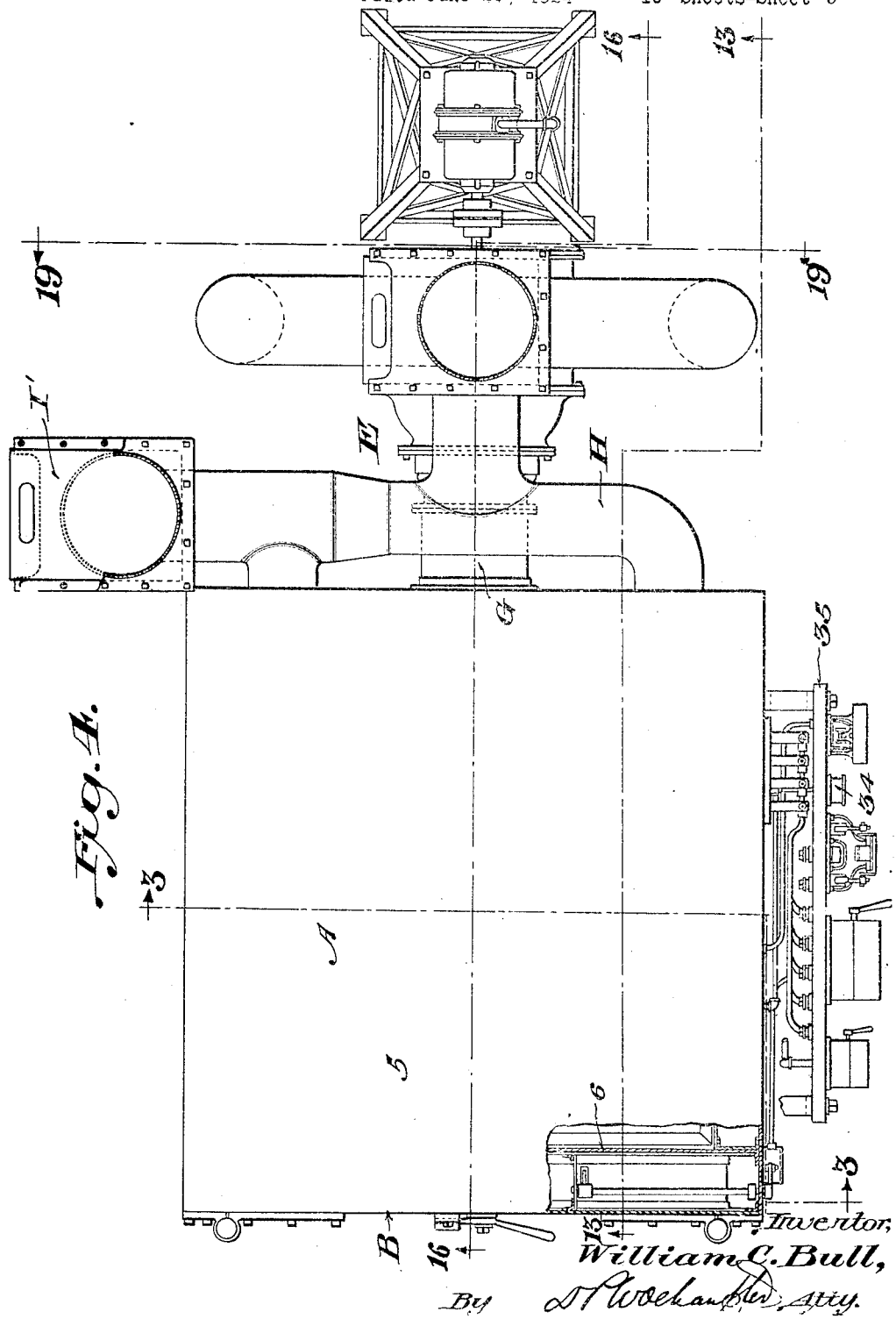
Figure 4 is a top view with a corner section broken away showing the automatic switch mechanism actuated by closing or opening one of the doors.

Figure 13 is a longitudinal section on the line 13—13 of Figure 4.

Figure 14 is a vertical section on the line 14—14 of Figure 16.

Figure 15 is a detail spacing stud showing deformed supporting burr.

Figure 16 is a longitudinal section on the line 16—16 of Figure 4.

Figures 17, 18:
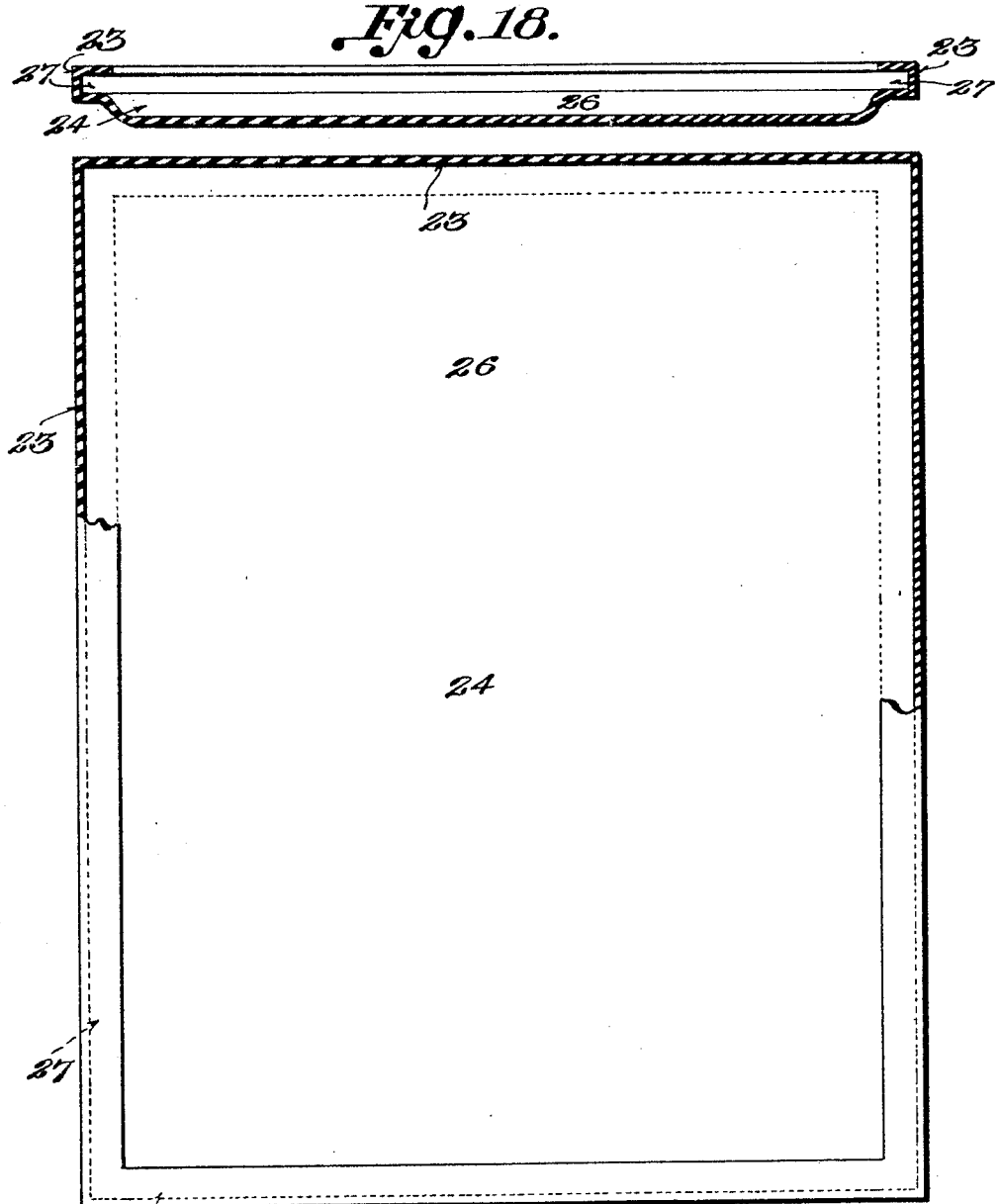

Figure 17 is a plan of the diaphragm, in detail.

Figure 18 is a cross sectional view of the diaphragm shown in Figure 17.

Figure 19 is an elevation on the line 19—19 of Figure 4.

Similar reference characters designate corresponding parts throughout the several figures of the drawings.

In making laminated reenforced glass of the type heretofore indicated it is proposed to combine sheets or plates of glass with a transparent cellulose membrane, which, with the air of a volatile liquid of hygroscopic qualities and heat becomes sticky or gelatinous to cause the adhesion of the glass sheets or plates. This material is placed as a unit in an oven designated generally as A having the doors B at one vertical side thereof and also provided around its top, bottom, side and rear walls with a plurality of electrical heating elements C which form in effect a skeleton cage of heating elements surrounding a novel multiple press device designated generally as D and receiving between its several individual units, the laminated glass product heretofore referred to.

The rear side of the casing is equipped with an air circulating system designated generally as E and fully described in detail in my aforesaid copending application. This circulating system contains a fan F which cooperates with the central passage-way G and the corner conduits H to provide three cycles of air currents, namely, an exhausting or vacuum producing cycle, then a heating cycle wherein the heat generated by the element C is passed through the press device D and about the sides thereof in a closed continuous circuit, and finally a cooling cycle wherein cool air is introduced into the oven and warm air expelled by properly setting suitable dampers I and I' respectively shown in Figs. 4 and 16.

The foregoing instrumentalities have all been fully illustrated and described in my copending case and therefore will not be further referred to in detail here because the primary novel and distinctive feature of the present invention resides in the novel construction, arrangement, and control of the multiple press device D, the same having a plurality of horizontally arranged individual press unit D' which are readily accessible through the doorway opened and closed by the doors B.

Among the other objects heretofore indicated the present invention has in view the use of a novel press device employing compressed air as the pressure medium. That is to say, it is proposed to provide a construction obviating the disadvantages of apparatus heretofore employing a fluid as the pressure medium, and yet at the same time having the advantages of the use of the relatively elastic characteristics of such a fluid as compressed air to firmly press the glass plates to their binder. Not only does the use of a compressed fluid permit of more definite control for the variable application of pressure, but also permits of such an arrangement of the individual press units as will enable each unit to function more definitely and positively because the weight of superposed units does not enter as a factor into the calculation of pressure imposed on the lowermost units of the stack.

Furthermore, by the use of compressed air during the initial stage of the heat period, through a sensitively operated air valve control, it is possible to control the pressure during the warming up stage so that the plasticity of the softening membrane may be taken advantage of at the opportune period to assure by this type of pressure, and its manipulations, a more dependable spreading out of the intermediate softening membrane, thus gaining a more general contact between all of the surfaces of the components entering into the material being treated.

Referring more specifically to the general construction and arrangement of the press device D and the instrumentalities cooperating therewith it will be observed that the said device essentially comprises four columns or posts so arranged as to act as guides for the relatively detachable and adjustable individual press units D' and also act as stops or abutments for preventing the same from moving too far backward into the oven, thereby always insuring perfect alinement of the superposed units. These columns or posts are respectively designated as 1—1 and 2—2, the former being the front pair and the latter being the rear pair. The front pair of posts 1—1 are spaced to receive the individual units D' between the same in such a manner that they may be readily inserted horizontally or laterally while the rear posts 2—2 are spaced closer together than the width of the units as clearly shown in Figure 5 to thereby constitute rear abutment members for the press units.

For the purpose of taking care of the loading and compression strains incident to the charging and operation of the press device D, suitable reenforcing means is employed in the oven casing. That is to say, the front posts 1—1 are positioned over the structural reenforcing elements 3—3 and under corresponding structural elements 4—4 concealed between the inner and outer plates 5 and 6 which form the oven casing, respectively at the bottom and top thereof as clearly shown in Figure 16. These reenforcing elements 3 and 4 are suitably connected by the vertical reenforcing elements 7 shown in Figure 5 thereby to provide a pair of rectangular reenforcing frames encircling the oven casing at the locations of the posts 1—1 and 2—2.

The said columns or posts 1—1 and 2—2 are detachably positioned within the oven so that they may be readily removed when it is desired to assemble a new set of press units. To that end the upper and lower extremities of the posts 1—1 and 2—2 are detachably fitted in the sockets or footing plates 8 clearly shown in Figures 1, 3, 13 and 16. These sockets 8 are securely fastened to the structural elements 3 and 4 and serve to maintain the vertical relationship of the columns 1—1 and 2—2, and also serve as substantial footing to resist effectively the thrusts derived from the spacing elements or blocks 9 as will be presently referred to more in detail.

Figure 3:
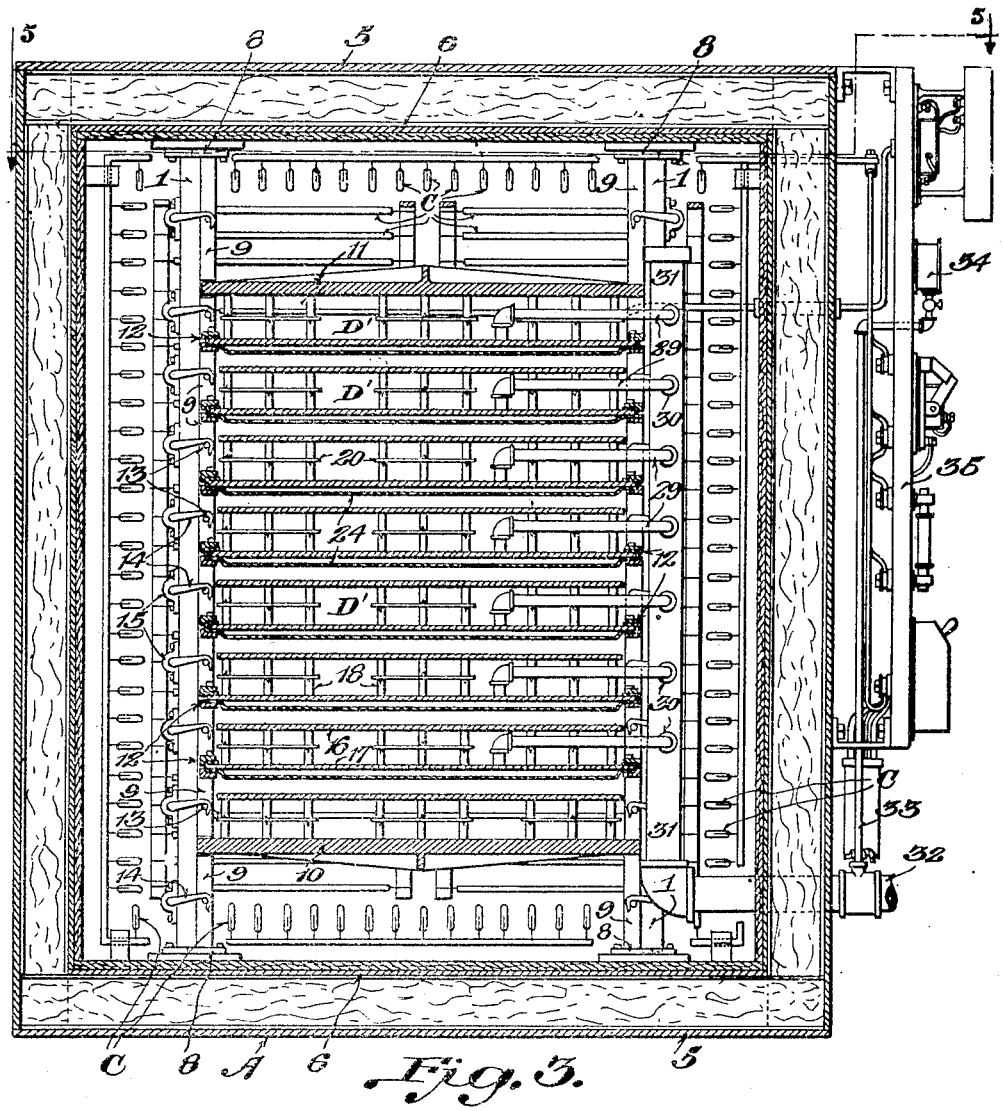
Figure 3 is a vertical transverse section along line 3—3 of Fig. 4.

As will be observed from Figure 3 of the drawings, for example, the individual press units D' are arranged between a bottom press plate 10 and a top press plate 11, the said top and bottom press plates as well as the intermediate press units being sustained and supported in spaced relation by the spacing elements or filler blocks 9. These blocks may be of any desired length as readily apparent from Figure 3 and serve to support and sustain, as well as space, all of the press units between the bottom and top plates 10 and 11 respectively. The bottom press plate 10 is supported on the top end of the spacing and supporting block 9 which is relatively longer than the intermediate spacing blocks 9 which engage and support projecting frame portions 12 of the press units D'. Obviously the length of the blocks or spacing elements 9 may be increased or diminished to effect the desired spacing between the individual press units D', and any suitable and convenient means may be utilized for holding the said blocks 9 to the posts 1—1 and 2—2. In the embodiment shown the said blocks 9 may be provided with the pin or lug 9 adapted to be engaged by a retaining hook 14 mounted as at 15 on the posts as shown in detail in Figures 9 and 11.

When all of the press units D' are assembled between the bottom plate 10 and top plate 11 it will be apparent that no relative movement will take place between the individual units D' because the multiplicity of spacing blocks 9 are coextensive with the columns so that the end blocks have a bearing in the sockets or footings 8 previously referred to. The individual press units D' are of novel construction and include in their organization platen 16 and a platen 17 united by suitable spacing and connecting bolts 18 and spacing posts 19. These posts carry at their intermediate portions the air deflecting partition plate or vane 20 which serves to split up and deflect air currents passing between the top and bottom platens 16 and 17 thereby more uniformly to distribute the heat over the metal surface for its conduction to the material under treatment. The said vane 20 is supported midway on the spacing studs or posts 18 by deformed burr portions 18$^a$ of the studs. The position of the spacing studs 18 which serve as bolts and the spacing studs 19 is so determined and distributed over the surface of the platens 16 and 17 as to receive the exerted compression load without deflection of either plate thereby forming a substantially rigid composite platen for the purpose intended. Thus, the spacing studs 18 and 19 and the baffle plate or vane 20 have the double function of reenforcing and connecting the platens 16 and 17 as well as preventing a high temperature central air zone being established practically midway between the platens 16 and 17.

The platen 17 of each unit D' is of greater width than the opposite platen 16 thereby providing the side extensions 21 the outer edge portion of which is grooved or countersunk as indicated at 22 in Figure 12 for receiving the surplus material in the edge portion 23 of the flexible diaphragm 24 when the unit is subjected to pressure. That is to say, upon compression of the material forming the diaphragm 24 between the extension 21 and the clamping plates 25, the portion 23, previously referred to, will move inwardly as indicated by the dotted lines in Figure 12 to thereby fill the groove 22 and more effectively seal the joint. As will be observed from Figures 17 and 18 the diaphragm 24 is made of a flexible non-porous material such for instance as rubber molded into the general cross sectional shape shown in Figure 18 thereby providing a bowl portion 26 and the grooved side portions 27 which fit around and about the extension 21 of the platen 17. As will be observed from Figures 8 and 12 the extension 21 of the platen is perforated to receive the bolts 25$^a$ for pressing the clamping bars 25 firmly against the edges of the flexible diaphragm and clamping the same in an air tight manner thereto. As shown in Figure 12 the inside faces of the clamping bars 25 may be serrated or ridged to firmly bite into and grip the edges of the diaphragm. The said clamping bars 25 and the extension 21 cooperate to provide the projecting frame portion 12 which is clamped between adjacent ends of the spacing blocks 9 which fill in the space between each unit.

The intermediate portion of the platen 17 is tapped by a pipe connection 28 forming a part of a branch feed pipe 29 connected by a compensating joint coupling 30 with a main air pressure supplying manifold 31 (see Figures 3 and 8). This manifold 31 is connected with a main air supply pipe 32 leading to a suitable compressor or the like and at a point exterior of the oven casing the said line 32 is provided with a gauge pipe line 33 which communicates with a pressure gage 34 on the panel board 35 of the apparatus. This gauge 34 has preferably associated therewith electrical means (not shown) for controlling an air valve (not shown) to prevent excessive pressure being supplied to the manifold 31.

It will therefore be understood that when air under pressure is turned into the manifold 31 all of the branch pipe 29 will supply a uniform pressure per square inch to the inflatable diaphragms 24, thereby to impart to the laminated material contained between one of the diaphragms 24 and the platen 16 of the press unit D′ below, sufficient predetermined pressure to accomplish the desired cementing operation.

From the foregoing, it will be seen that the effect of supplying pressure to the diaphragms 24 is to apply such pressure uniformly to the laminated product between the individual press units, the latter being positively held or locked against movement due to the fact that the blocks 9 which space the individual press units as well as the bottom plate 10 and top plate 11 form in effect rigid couplings which are locked between the sockets or footings 8. When the pressure is released from the diaphragms 24 and the last product has been sufficiently cooled, the same may be readily removed from between the individual press units in any suitable and convenient manner through the doors B of the oven.

The operation and functions of the present apparatus with reference to heating and cooling are the same as set forth in my co-pending application referred to herein, but for the purpose of briefly explaining the several steps in the process of using the apparatus, it may be pointed out that after the press device D has been set up to accommodate the product of desired thickness, and the product M has been positioned between the diaphragm 24 and the platen 16 of the press unit D′, the doors B may be closed and sealed and pressure supplied to the diaphragms 24. The heating means C may then be started to function. Simultaneously with the preliminary heating, the fan F exhausts the air trapped within the oven together with latent moisture and gases given off by the cementing membrane, thereby causing a partial vacuum which materially assists in the subsequent heating which produces the cementing operation.

The damper I′ having remained closed, the damper I may then be closed and the fan F reversed so as to provide a closed heated-air circuit within the machine, the same passing from the central conduit G through the static air chamber G′ and thence through the rear bank of heating elements C and into the directing baffle G² which concentrates the heated blast on the individual units of the press device. The air then moves through the open frame-work constituting the press units D′ and strikes the baffle plates on the doors B whence it is thrown towards the side of the cabinet and thence drawn back into the fan to complete the circuit. In connection with the arrangement of the rear bank of heating elements C between the central conduit G and the press device D it may be pointed out that considerable advantage results from this arrangement due to the fact that the exhaust cycle tends to keep the rear bank of heating elements relatively cool so that during the initial stages of the heating circuit, the air will be gradually warmed up so as to avoid a sharp change in temperature in the air supply to the units D′.

After the heating circuit has been continued for the desired length of time, the dampers I and I′ may be opened to permit the fan F to inject cooling air into the oven thereby to bring the product to a convenient handling temperature.

From the foregoing it will be apparent that the present invention provides a press device including a plurality of individual press units each having its own pressure means, the construction and arrangement of the units being such that they are readily insertable and removable within the oven thereby to not only provide for a variable spacing of the units but to also increase or diminish the capacity of the device, as desired.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An apparatus of the class described including a casing, a multiple press device comprising a plurality of individual press units arranged one above the other in fixed relation, pressure means for each unit adapted to cooperate with the adjacent unit thereby to exert pressure on the material to be fabricated.

2. In an apparatus of the class described, a casing, a multiple press device within said casing including a plurality of superposed press units, means for mounting said units in fixed spaced relation, and individual pressure means for each unit.

3. In an apparatus of the class described, a casing, a multiple press device within said casing including a plurality of superposed press units, a plurality of removable separating and spacing elements for holding said press units in fixed spaced relation, and individual pressure means for each unit.

4. In an apparatus of the class described, a casing, a multiple press device adapted to be removed and set up within said casing according to the requirements of glass to be fabricated, said device including a plurality of individual press units, and pressure means for each unit.

5. In an apparatus of the class described, a casing, a multiple press device adapted to be removed and set up within said casing according to the requirements of glass to be fabricated, said device including a plurality of individual press units, consisting of spaced apart platen members providing an air passage, detachable means for supporting said units in spaced relation, means for coursing an air blast through said units, and pressure means associated with each unit.

6. In an apparatus of the class described, a casing, a multiple press device including a plurality of relatively adjustable press units mounted in spaced relation within a frame, and a flexible diaphragm associated with each unit.

7. In an apparatus of the class described, a casing, a multiple press device arranged within said casing and including a plurality of superposed press units, means for mounting said units in fixed spaced relation and an inflatable diaphragm carried by each unit and constituting the pressure means thereof.

8. In an apparatus of the class described, a casing, a multiple press device arranged within said casing and including a plurality of superposed press units, means for setting said units to the desired spacing, a flexible diaphragm carried by each unit, and means for simultaneously applying pressure to each diaphragm.

9. In an apparatus of the class described, a casing, a multiple press device arranged within said casing and including a plurality of superposed press units, means for setting said units to the desired spacing, a flexible diaphragm carried by each unit, and a manifold having pipe connections leading to each unit to simultaneously supply the diaphragm of each unit with pressure.

10. In an apparatus of the class described, a casing, a plurality of upright columns bearing against the top and bottom walls of said casing, and a plurality of interchangeable and removable individual press units arranged between said columns, and pressure means carried by each unit.

11. In an apparatus of the class described, a casing, a plurality of upright columns bearing against the top and bottom walls of said casing, a plurality of interchangeable and removable individual press units arranged between said columns, spacing blocks for engaging and supporting said press units in proper spaced relation, pressure means carried by each unit and means for simultaneously actuating the pressure means of all of said units.

12. In an apparatus of the class described, a casing, a plurality of upright columns bearing against the top and bottom walls of said casing and constituting rigid press unit guiding and centering means, a plurality of individual press units arranged between said columns, a plurality of blocks for spacing said units and constituting a sectional column, also bearing against the top and bottom walls of the casing, a pressure diaphragm carried by each unit, and means for supplying pressure thereto.

13. In an apparatus of the class described, a casing, a pair of rectangular loading and distributing frames embedded within the walls of said casing, a pair of front columns and a pair of rear columns bearing against said frames, a plurality of individual press units arranged between and against said columns, a plurality of blocks for spacing said units and constituting sectional columns also bearing against the said frames, pressure means carried by each unit, and means for supplying pressure to the said pressure means of each unit.

14. In an apparatus of the class described, a casing, a pair of upright columns bearing against the top and bottom walls of said casing, a second pair of upright columns also bearing against the top and bottom walls of said casing and spaced closer together than said front columns and in rear thereof, a plurality of press units adapted to be arranged one above the other between said front columns and abutting against said rear columns, and spacing elements constituting sectional columns connected with the said upright columns and serving to rigidly space the individual press units, and pressure means carried by each press unit.

15. In an apparatus of the class described a casing, a plurality of upright rigid columns constituting a press frame, a plurality of individual press units arranged between said columns, and means connected with said rigid columns for supporting said units in spaced relation.

16. In an apparatus of the class described, a casing, a plurality of upright rigid columns constituting a press frame, a plurality of individual press units arranged between said columns, and spacing blocks detachably connected with said rigid columns for supporting said units in spaced relation.

17. In an apparatus of the class described, a multiple press device including a plurality of relatively fixed press units each comprising upper and lower platen members, means for rigidly uniting and spacing said platen members, air blast deflecting means arranged between said members, and a flexible diaphragm carried by one of said platen members.

18. In an apparatus of the class described, a multiple press device including a plurality of relatively fixed press units equidistantly spaced apart and consisting of upper and lower platen members having an air circulating space therebetween, an inflatable diaphragm having its edges turned over and about the lower platen member, means for clamping said edges to the lower platen member, and means for supplying fluid pressure to said diaphragm.

19. In an apparatus of the class described, a multiple press device including a plurality of relatively fixed press units, and means for supporting and maintaining said units in fixed relation comprising a plurality of upright posts, and detachable elements associated with said posts for engaging and spacing adjacent units.

20. In an apparatus of the class described, a multiple press device including a plurality of relatively fixed press units, and means for supporting and maintaining said units in fixed relation comprising a plurality of upright posts, and blocks having lugs and adapted to lie flat against said posts, and hooks carried by the posts for engaging said lugs.

21. In an apparatus of the class described, a multiple press device including a plurality of superposed press units each comprising upper and lower platen members one of which is of greater dimensions than the other, and means adapted to be interposed between the platen member of greater dimensions of each unit thereby to support and space said units one above the other.

22. In an apparatus of the class described, a multiple press device including a plurality of individual press units each including spaced apart platen members, one member being of greater dimensions than the other member, an inflatable diaphragm carried by said latter member and removable means for engaging the largest members of each unit thereby to space and support the same one above the other.

23. In an apparatus of the class described, a multiple press device including a plurality of individual press units arranged one above the other and each comprising spaced apart platen members, an inflatable diaphragm carried by the one member of each unit and cooperating with the adjacent member of the next unit to provide a laminated glass press cell.

24. In an apparatus of the class described, a multiple press device including a plurality of superposed press units, each containing spaced apart platen members, an inflatable diaphragm carried by one platen member and having the edge portions thereof folded thereover, clamping means for engaging the edge of the diaphragm to provide an airtight joint and means for supplying said diaphragm with fluid under pressure.

In testimony whereof I hereunto affix my signature.

WILLIAM C. BULL.